United States Patent
Rizzio

(10) Patent No.: US 10,502,333 B2
(45) Date of Patent: Dec. 10, 2019

(54) BALL VALVE WITH COMPONENTS INTEGRATED INTO THE BALL MEMBER

(71) Applicant: RED-WHITE VALVE CORP., Lake Forest, CA (US)

(72) Inventor: Giovanni Rizzio, Mission Viejo, CA (US)

(73) Assignee: RED-WHITE VALVE CORP., Lake Forest, CA (US)

(*) Notice: Subject to any disclaimer, the term of this patent is extended or adjusted under 35 U.S.C. 154(b) by 0 days.

(21) Appl. No.: 15/823,412

(22) Filed: Nov. 27, 2017

(65) Prior Publication Data

US 2018/0149275 A1 May 31, 2018

Related U.S. Application Data

(60) Provisional application No. 62/427,128, filed on Nov. 28, 2016.

(51) Int. Cl.
*F16K 15/18* (2006.01)
*F16K 5/06* (2006.01)
(Continued)

(52) U.S. Cl.
CPC .......... *F16K 15/183* (2013.01); *B01D 29/071* (2013.01); *B01D 35/04* (2013.01);
(Continued)

(58) Field of Classification Search
CPC .... F16K 5/0605; F16K 15/183; F16K 15/188; F16K 51/00; B01D 35/04
(Continued)

(56) References Cited

U.S. PATENT DOCUMENTS 2,440,144 A 4/1948 Hosking
3,146,792 A * 9/1964 Donnelly et al. ..... F16K 5/0605
137/268

(Continued)

FOREIGN PATENT DOCUMENTS

CN 202176746 3/2016
EP 0457342 A2 11/1991
(Continued)

OTHER PUBLICATIONS

Data Sheet, How to Install PEX tubing. PEX Tubing Installation. Making a Crimp Connection, http://www.pexuniverse.com/content/how-install-pex-tubing-installation, 6 pages.
(Continued)

*Primary Examiner* — Kevin L Lee
(74) *Attorney, Agent, or Firm* — Lewis Roca Rothgerber Christie LLP

(57) ABSTRACT

Embodiments provide a ball valve with components integrated into a ball member of the ball valve. The ball member includes an integrated regulating element, which may be a check valve, a pressure or flow regulating valve, or a filter. The components integrated into the ball member are positioned entirely within ends of the ball member such that the ball member can rotate to assume open and closed positions of the ball valve. The components integrated into the ball member can be configured to be removable from the ball member, for example by hand and without the use of tools, or can be configured to prohibit removal once coupled to the ball member.

17 Claims, 14 Drawing Sheets

(51) Int. Cl.
*B01D 35/04* (2006.01)
*F16K 51/00* (2006.01)
*B01D 29/07* (2006.01)

(52) U.S. Cl.
CPC .......... *F16K 5/0605* (2013.01); *F16K 15/188* (2013.01); *F16K 51/00* (2013.01)

(58) Field of Classification Search
USPC .................................................. 137/614.17
See application file for complete search history.

(56) References Cited

U.S. PATENT DOCUMENTS

| | | | |
|---|---|---|---|
| 3,271,845 A | 9/1966 | Breher | |
| 3,712,584 A | 1/1973 | Wise et al. | |
| 3,854,497 A | 12/1974 | Rosenberg | |
| 3,907,959 A | 9/1975 | Wise et al. | |
| 4,180,542 A | 12/1979 | Wrasman | |
| 4,430,285 A | 2/1984 | Runyan et al. | |
| 4,476,891 A | 10/1984 | Mulas | |
| 4,488,573 A | 12/1984 | Runyan et al. | |
| 4,553,562 A | 11/1985 | Nakada | |
| 4,932,436 A | 6/1990 | Kanemaru | |
| 5,305,790 A * | 4/1994 | Giacomini | F16K 5/0605 137/542 |
| 5,366,257 A | 11/1994 | McPherson et al. | |
| 5,373,868 A | 12/1994 | Rodriguez | |
| 5,586,579 A | 12/1996 | Diehl | |
| 5,895,695 A | 4/1999 | Rowley | |
| 6,098,659 A | 8/2000 | Mannis | |
| 6,260,820 B1 | 7/2001 | Chowdhury | |
| 6,287,501 B1 | 9/2001 | Rowley | |
| 6,539,976 B1 | 4/2003 | Whiteside | |
| 6,814,101 B2 * | 11/2004 | Flauzac | F16K 5/0605 137/517 |
| 7,051,763 B2 | 5/2006 | Heren | |
| 8,220,126 B1 | 7/2012 | Yunk | |
| 8,231,101 B2 | 7/2012 | Hagihara | |
| 8,360,092 B2 | 1/2013 | Tappe | |
| 8,739,826 B2 | 6/2014 | Thomas et al. | |
| 8,840,148 B2 | 9/2014 | Defilippi | |
| 8,844,111 B1 | 9/2014 | Yunk, Jr. et al. | |
| 8,881,586 B2 | 11/2014 | Rothstein et al. | |
| 9,169,953 B2 | 10/2015 | Cavagna | |
| 9,187,883 B2 | 11/2015 | Armbruster et al. | |
| 10,036,481 B2 | 7/2018 | Reck | |
| 2009/0032761 A1 | 2/2009 | Tsai | |
| 2009/0306598 A1 | 12/2009 | Arcaro et al. | |
| 2011/0017932 A1 | 1/2011 | Domingues Matos | |
| 2015/0308576 A1 | 10/2015 | Yelkin et al. | |
| 2016/0084398 A1 | 3/2016 | Reck | |

FOREIGN PATENT DOCUMENTS

| | | |
|---|---|---|
| EP | 2056011 A2 | 5/2009 |
| EP | 2284431 A1 | 2/2011 |
| ES | S2267971 T3 | 3/2007 |
| JP | H 0882395 A | 3/1996 |
| RU | 2229649 C1 | 5/2004 |
| WO | WO 01/36850 A1 | 5/2001 |
| WO | WO 2011/039623 A2 | 4/2011 |

OTHER PUBLICATIONS

Canadian Office action issued in corresponding CA Application No. 2967274, dated Mar. 8, 2018, 4 pages.
Office action issued in U.S. Appl. No. 15/594,479 dated Dec. 12, 2018, 18 pages.
Canadian Office action issued in Application No. 2,967,274, dated Dec. 28, 2018, 5 pages.
Canadian Office action issued in Application No. 2,987,174, dated Nov. 23, 2018, 5 pages.
Canadian Office action dated Jul. 9, 2019 in corresponding Canadian Patent Application No. 2,987,174 (4 pages).

* cited by examiner

BALL VALVE WITH COMPONENTS INTEGRATED INTO THE BALL MEMBER

CROSS REFERENCE TO RELATED APPLICATIONS

The present invention claims the benefit of U.S. Provisional Application Ser. No. 62/427,128, filed Nov. 28, 2016, the contents of which are hereby incorporated by reference in their entirety.

FIELD OF INVENTION

The present invention relates to a ball valve with components integrated into the ball member of the ball valve.

BACKGROUND

Multiple types of separate valves have been used in commercial practice to control fluid flow in pipes, hoses, and tubes. Ball valves are used as a shut off valve to cut off fluid flow. Check valves are used to prevent back flow of fluid, for example due to a downstream loss of pressure. Pressure and flow regulating valves are used to maintain outlet flow from the valve within acceptable limits.

Existing valves, such as ball valves, check valves, and pressure and flow regulating valves, typically make extensive use of metal or other materials in their valve bodies, which may be expensive. Systems incorporating separate valves for various functions, such as a separate ball valve and a check valve connected to the outlet of the ball valve, or a separate ball valve and flow regulating valve, require relatively large amounts of material and associated costs. Systems combining a ball valve and check valve typically require a larger valve body to accommodate a combined valve and suffer from similar problems as separate ball valves and check valves.

SUMMARY OF THE INVENTION

Accordingly, there is a need for a combined ball valve which is more compact and which reduces the amount of material and costs.

The present disclosure provides a ball valve with components integrated into the ball member of the ball valve. In various embodiments, the ball member can include an integrated regulating element, which may be, for example, a check valve, a pressure or flow regulating valve, or a filter. The components integrated into the ball member can be configured to be removable from the ball member, for example by hand and without the use of tools, or the integrated components can be configured to be prevented from removal once coupled to the ball member.

In some embodiments, a ball valve includes a ball member and a regulating element separate from the ball member. The regulating member is configured to be inserted into a passage in the ball member with an entire length of the regulating member located between ends of the ball member (e.g., an entire length of the regulating member is positioned within the passage and between front and rear ends of the ball member). The ball valve includes a retainer for coupling the regulating element to the ball member, where the retainer is expandable to be received in a groove of the passage. In some embodiments, the regulating element and the retainer are monolithic, while in other embodiments, the regulating element and the retainer are separate parts.

In some embodiments, an integrated ball and check valve is provided which includes a valve body, two ports, a ball member having a bore and configured to be inserted in the valve body, and a check valve configured to be inserted in the bore of the ball member. The ball member has a first retention element configured to retain the check valve inside a first end of the ball member. The first retention element may be a lip projecting into the bore of the ball. The first retention element may be located at or adjacent the first end of the ball member. The ball member has a second retention element that engages one or more retention members of the check valve to permit insertion of the check valve from a second end of the ball member and retain the check valve inside the second end of the ball member. The second retention element of the ball member may be a groove projecting or extending away from (e.g., outside) the bore and may be spaced apart from the first and second ends of the ball member. The retention members of the check valve may be one or more flanges configured to be received in the groove of the bore.

In some embodiments, an integrated ball and check valve includes a valve body, two ports, a ball member having two ends and a bore therethrough, and a check valve. The ball member is configured to be inserted in the valve body. The check valve has a housing and a moveable core member inside of the housing. The check valve is configured to be inserted in the bore of the ball member from the second end of the ball member. When the check valve is inserted in the ball member such that the housing is located between the first end and the second end of the ball member, the housing is moveable toward the first end of the ball member and is prevented from being removed from the ends of the ball member.

DETAILED DESCRIPTION

Figure 1:
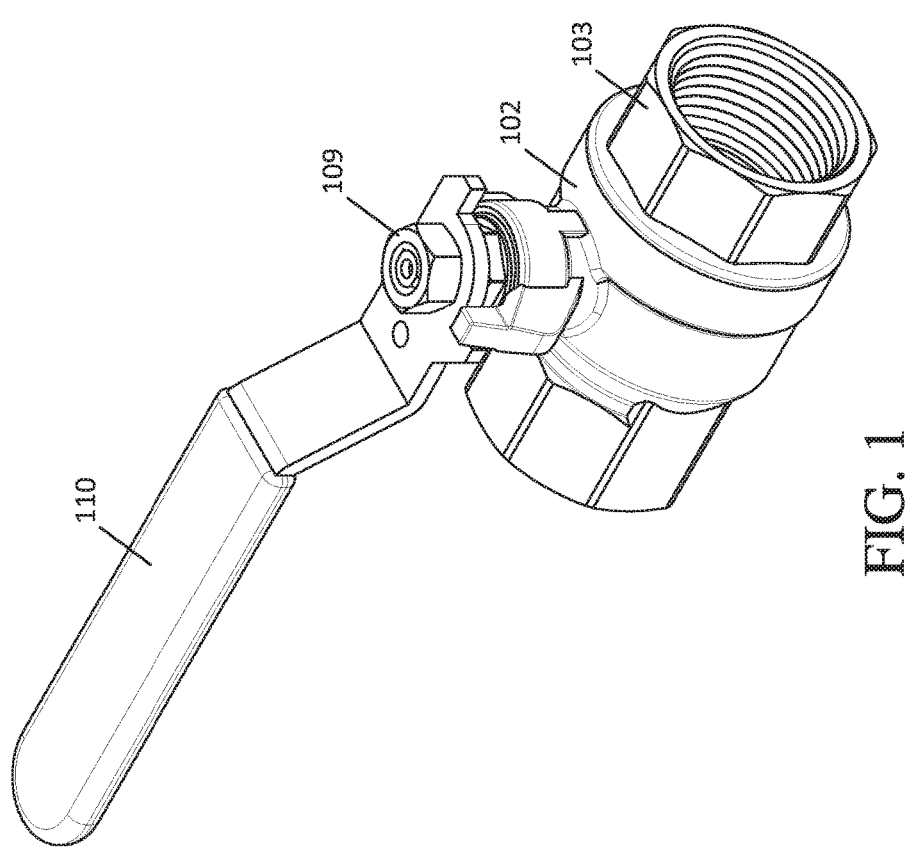
FIG. 1 illustrates a front isometric view of an integrated ball and check valve according to some embodiments of the invention.
Figure 2:
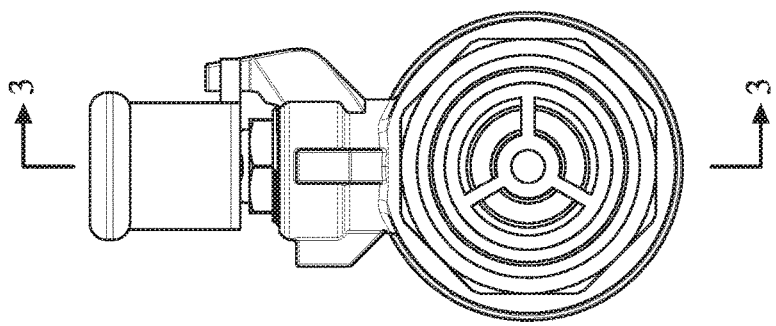
FIG. 2 illustrates front view of the integrated ball and check valve of FIG. 1.

FIGS. 1-4 illustrate an integrated ball and check valve 100 according to some embodiments of the present disclosure. The valve 100 of FIGS. 1-4 includes a valve body 102, a valve cap 103, a ball or ball member 104, valve seats 106, a stem 108, a handle 110, and an integrated regulating element 112. The valve 100 may additionally include a packing ring 105, a packing nut 107, and a fastener 109. As described more fully below, the ball 104 provides a mechanism for providing on and off control of fluid flow (e.g., liquid or gaseous flow) through the valve 100. The valve seats 106 provide a seal for the ball 104, and the stem 108 and handle 110 may be used to actuate the on and off control of the ball 104.

The valve body 102 includes a first end 102a and an opposite second end 102b, and the valve cap 103 includes a first end 103a and an opposite second end 103b.

The valve body 102 and the valve cap 103 may be connected to each other. In some embodiments, the valve cap 103 may be inserted into at least a portion of the valve body 102 and connected to the valve body 102. A connection portion 113 of the valve cap 103 may be inserted into a corresponding connection region 114 of the valve body 102 to connect the valve cap 103 to the valve body 102. In some embodiments, the connection region 114 of the valve body 102 and/or the connection portion 113 of the valve cap 103 may be threaded, and may connect to each other by a threaded engagement. However, the invention is not limited thereto or thereby, and the valve cap 103 and the valve body 102 may be connected by other suitable connections, such as a snap fit, bolts, adhesives, welding, or the like. The connection region 114 of the valve body 102 may be located at or adjacent the first end 102a of the valve body 102. The connection portion 113 of the valve cap 103 may be located at or adjacent the second end 103b of the valve cap 103. The valve cap 103 may include a flange 113a that abuts against the first end 102a of the valve body 102 when the valve body 102 and the valve cap 103 are connected. The valve body 102 and/or the valve cap 103 may be a metal, for example, brass, or any other suitable material.

The valve body 102 and the valve cap 103 may each include a port 116 for connecting to pipes, hoses, and/or tubing (e.g., via fittings). The valve body 102 may include a port 116 at its second end 102b and the valve cap 103 may include a port 116 at its first end 103a. In some embodiments, the ports 116 may be threaded. The valve body 102 includes a chamber 118 housing the ball 104 and a valve seat 106, which are each located coaxially with the ports 116. The valve cap 103 includes a groove 115 housing a valve seat 106, which is located coaxially with the ports 116. In some embodiments, the valve body 102 and the valve cap 103 may each include an integrated fitting instead of a port 116.

Figure 6:
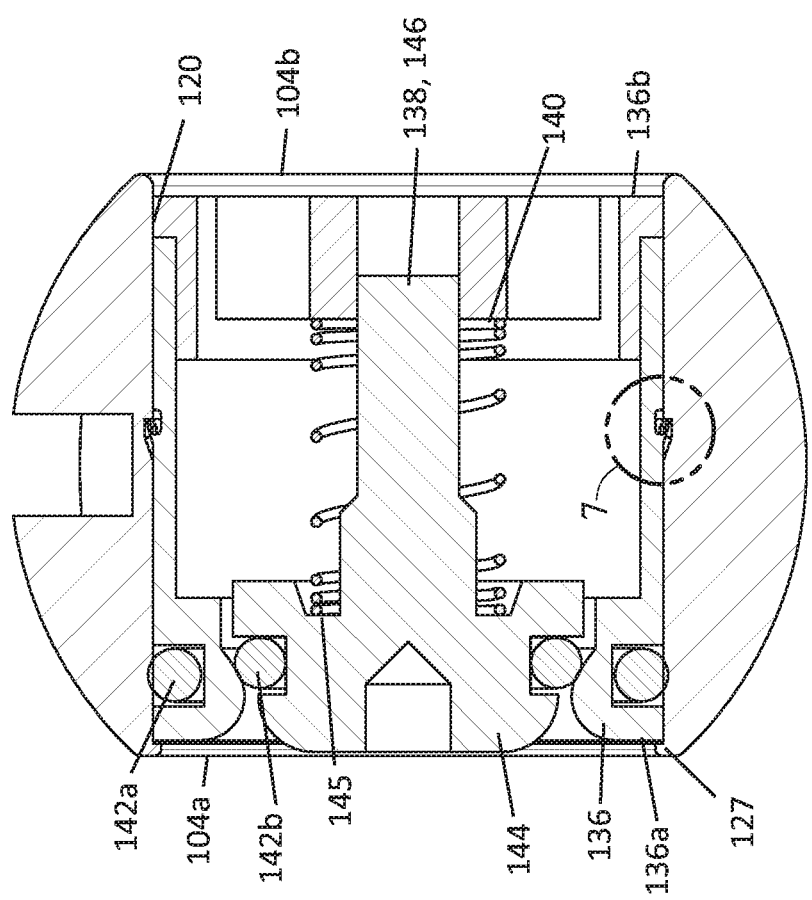
FIG. 6 illustrates a cross-sectional view of the ball of FIG. 2.

The ball or ball member 104 is a substantially spherical member with a bore or passage 120 extending through the ball 104 from a first or front end 104a to a second or rear end 104b of the ball 104 (see, e.g., FIG. 6). The ball 104 provides on and off control of fluid flow between the ports 116 of the valve 100. When the bore 120 of the ball 104 is aligned with the ports 116, the valve 100 is in an open position where the ports 116 are in fluid communication. In the open position, fluid is able to flow between the ports 116 of the valve 100. When bore 120 of the ball 104 is perpendicular with the ports 116, the valve 100 is in a closed position where the ports 116 are not connected to each other. In the closed position, fluid is restricted from flowing between the ports 116. The ball 104 may be made of metal, for example brass, chrome plating, chromium plated steel, chromium plated brass, and the like. The ball 104 may be made of materials that provide corrosion resistance against fluid flowing in the valve 100 and that provide resistance against wear.

The ball 104 may be connected to the stem 108 that may be in turn connected to the handle 110. The handle 110 may be located in an upper portion of the ball valve 100 relative to the location of the ball 104 (e.g., above the ball when the ball valve is installed in a piping system). It should be appreciated that the location of the handle 110 may vary, and may, for example, be located below the ball 104 or on a side of the ball 104. The handle 110 may be rotated or pivoted (e.g., manually or automatically rotated) to actuate the ball 104 to place the valve 100 in the open or closed position. The handle 110 may be aligned with the bore 120 of the ball 104 such that the handle 110 is parallel with the ports 116 when the valve 100 is in the open position and the handle 110 is perpendicular with the ports 116 when the valve 100 is in the closed position. The handle 110 may be rotated or pivoted 90 degrees to place the valve 100 into the open position from the closed position, and vice versa. The handle 110 may be made of nylon or any other suitable material.

The ball 104 may include an engagement feature 126 to connect to the stem 108. The stem 108 may include a corresponding engagement feature 128 to connect to the ball 104. In some embodiments, the engagement feature 126 of the ball 104 may be a slot or key and the engagement feature of the stem 108 may be a post or flange configured to engage the slot of the ball 104. In some embodiments, the engagement feature 126 of the ball 104 may be a post or flange and the engagement feature of the stem 108 may be a slot or key configured to receive the post of the ball 104.

Figure 3:
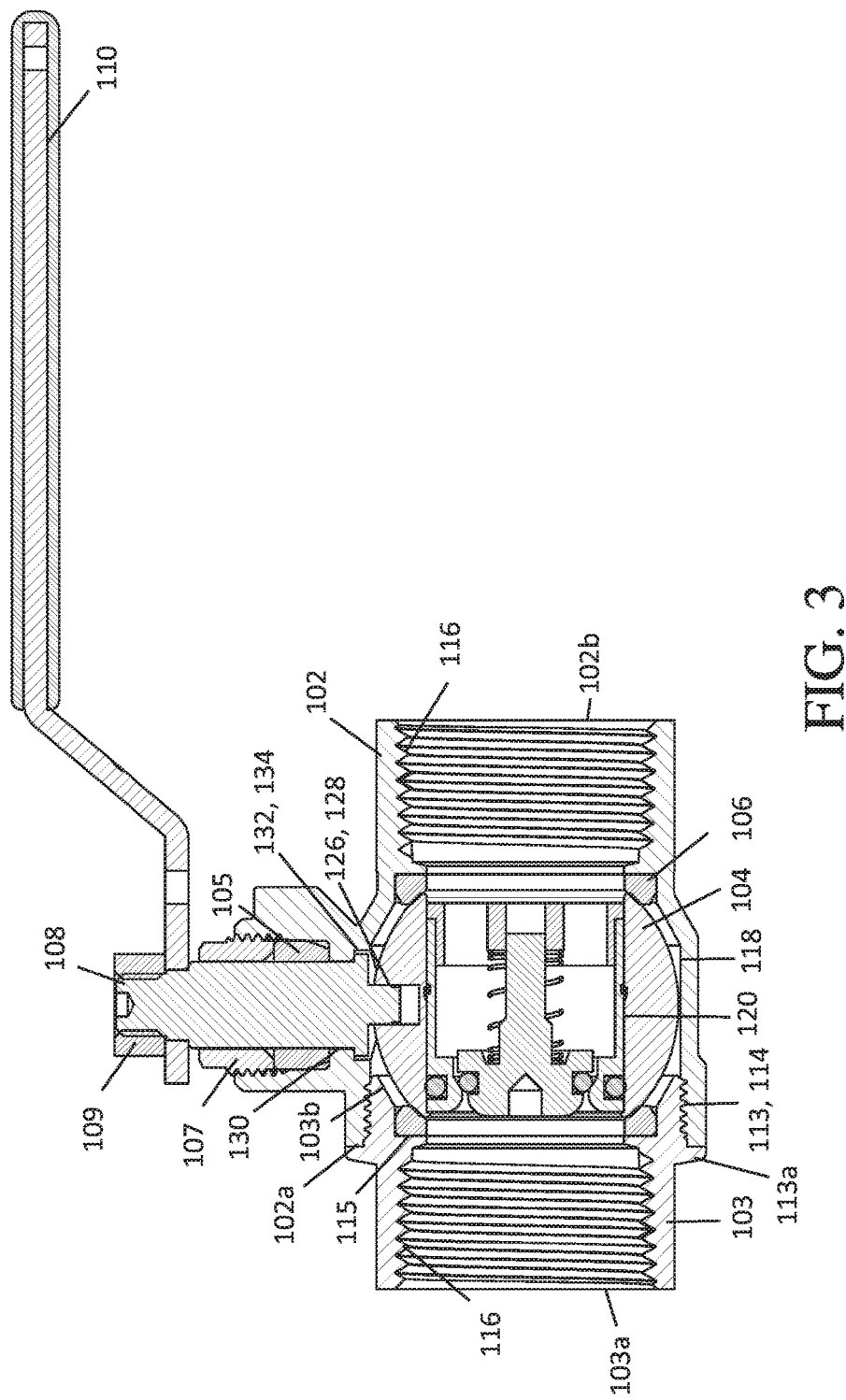
FIG. 3 illustrates a cross-sectional view of FIG. 2, the cross-section taken along the line 3-3, according to some embodiments of the invention.
Figure 4:
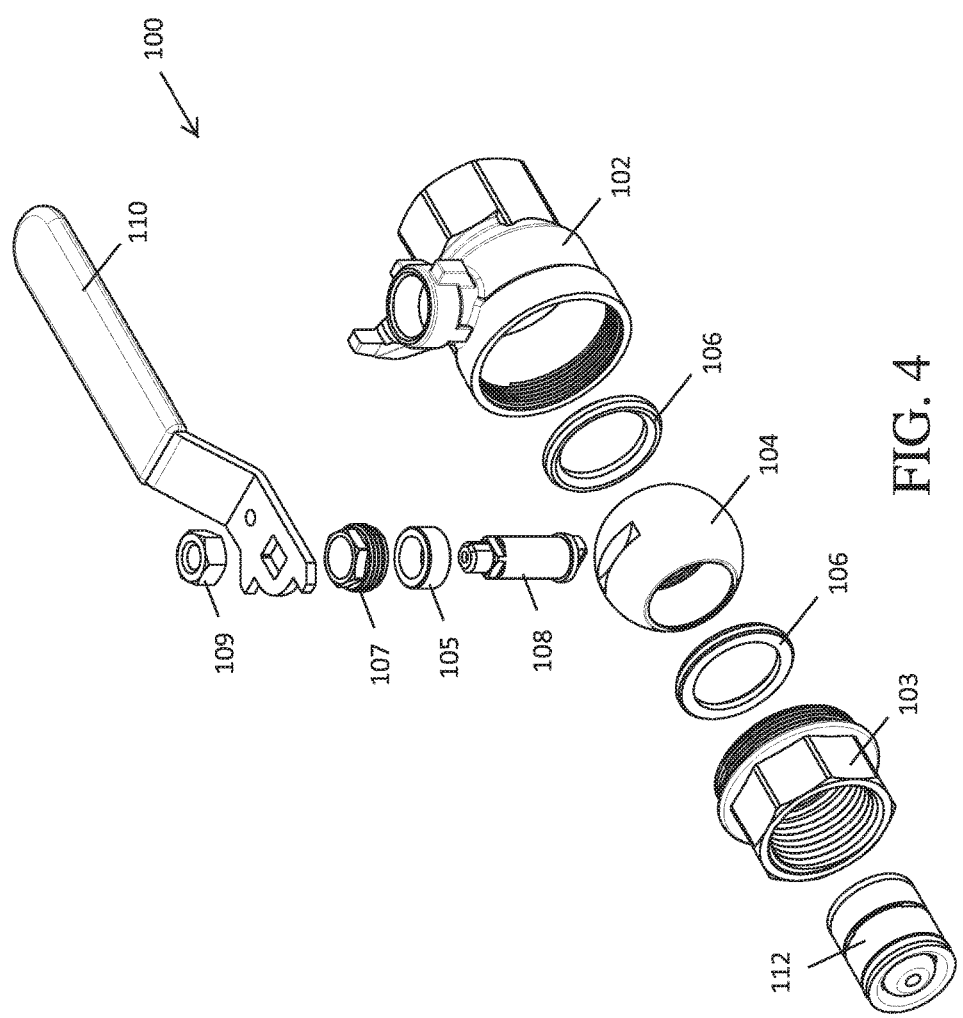
FIG. 4 illustrates an exploded view of the integrated ball and check valve of FIG. 1.

The stem 108 may be partially located in a bore 130 in the valve body 102. The stem 108 may include a flange 132 to retain the stem 108 inside the valve body 102. The flange 132 may fit within a recess 134 of the valve body 102 to maintain the position of the stem 108 inside of the valve body 102. The valve 100 may include the packing ring 105 and the packing nut 107 to seal the stem 108. The packing nut 107 may be attached to the valve body 102 by a threaded engagement as shown in FIG. 3. The stem 108 may be connected to the handle 110 via the fastener 109. The stem 108 may be made of metal, for example brass or other suitable materials.

Figure 5:
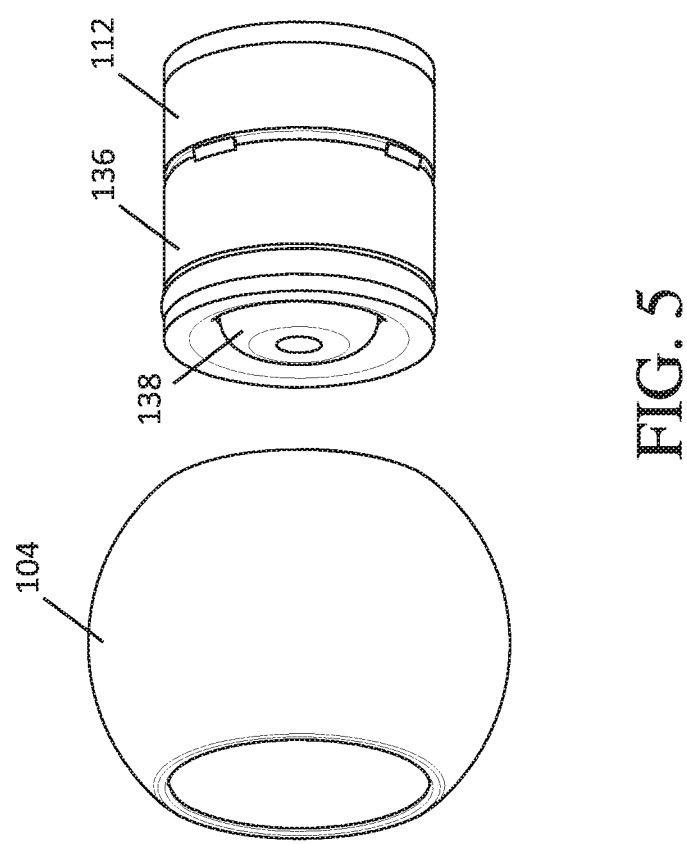
FIG. 5 illustrates an exploded view of the ball of FIG. 2 according to some embodiments of the invention.
Figure 7:
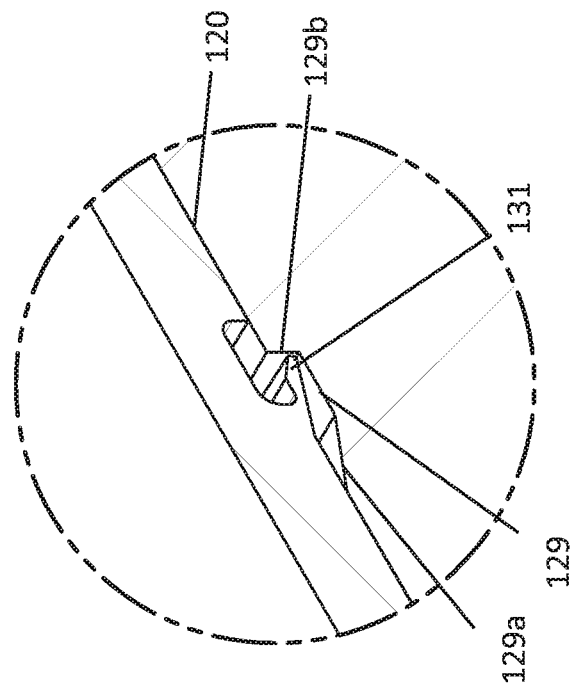
FIG. 7 illustrates a detail of the cross-sectional view of FIG. 6.

FIGS. 5-7 illustrate a ball 104 with an integrated regulating element 112 according to some embodiments. As described further below, the regulating element 112 regulates flow through a fluid or gaseous system connected to the valve 100. The regulating element 112 may be a check valve, which functions as a one-way valve that prevents back flow of fluid through the valve 100. As shown in FIGS. 3 and 6, the regulating element 112 is integrated into the ball 104 of the valve 100. The regulating element 112 may be integrated into the ball 104 such that a length of the valve body 102 and connected valve cap 103 including the integrated regulating element 112 (e.g., measured from the first end 103a of the valve cap 103 to the second end 102b of the valve body 102) has the same overall length as a ball valve without the integrated regulating element 112. In other words, the inclusion of the integrated regulating element 112 does not alter the overall length of the ball valve. The regulating element 112 may be positioned entirely within the ball 104 such that when the ball 104 is rotated (e.g., by rotating handle 110), the regulating element 112 with the ball 104. The regulating element 112 may be positioned such that the regulating element 112 is aligned with the ports 116 of the valve 100 when the valve 100 is in the open position (e.g., a longitudinal axis of the regulating element 112 may be aligned with the ports 116), and perpendicular with the ports 116 when the valve 100 is in the closed position.

As shown in FIGS. 5 and 6, the regulating element 112 in some embodiments includes a housing 136, a core member 138, a spring 140, and one or more O-rings 142a, 142b. The housing 136 may include a front end 136a and a rear end 136b. The front end 136a may form an inlet for fluid flow into the regulating element 112 and the rear end 136b may form an outlet for fluid flow out of the regulating element 112. The core member 138 may be located inside the housing 136 and may be moveable along a longitudinal direction of the core member 138 (e.g., the core member 138 may translate in a substantially horizontal direction relative to the orientation shown in FIG. 6). The core member 138 may include a head 144 located adjacent the front end 136a of the housing 136 and a body 146 that extends toward the rear end 136b of the housing 136. The head 144 and body 146 of the core member 138 may be of a single-piece construction. The head 144 may have a larger radius than the body 146.

The housing 136 and core member 138 may be made of a polymer material, such as nylon or polyoxymethylene (POM). The housing 136 and the core member 138 may be made of the same material or may be made of different materials. The material(s) of the housing 136 and the core member 138 may be different than the material of the ball 104.

The spring 140 may be positioned between a portion of the core member 138 and a portion of the housing 136 to bias the core member 138 toward the front end 136a of the housing 136. In some embodiments, one end of the spring 140 may located in a recess 145 of the head 144 to bias the head 144 toward the front end 136a of the housing 136. The spring 140 may be under a preload or in axial compression in the configuration shown in FIG. 6. The spring 140 may be located around a circumference of the body 146 of the core member 138. In addition, an inner diameter of the housing 136 adjacent the front end 136a of the housing 136 may be less than a maximum diameter of the head 144 to prevent the core member 138 from being removed from the front end 136a of the housing 136. An O-ring 142b may be seated in an interface between the head 144 and the housing 136. The spring 140 may prevent the core member 138 from being removed from the rear end 136b of the housing 136. As such, the core member 138 may be constrained from being removed from the housing 136.

The regulating element 112 may be integrated into the ball 104 as follows. The regulating element 112 may be inserted into the ball 104 from a rear end 104b of the ball 104 and moved (e.g., slid) toward a front end 104a of the ball 104. The ball 104 may have a first retention element 127 that projects or extends into the bore 120 (e.g., into the inside of the bore 120) of the ball adjacent the front end 104a of the ball 104 (see FIG. 6). The first retention element 127 retains the regulating element 112 inside of the front end 104a of the ball 104. The first retention element 127 may be in the shape of a lip. The lip 127 may project circumferentially into the bore 120. The lip 127 may act as a stop preventing the regulating element 112 from being easily removed from the front end 104a of the ball 104.

Figure 8:
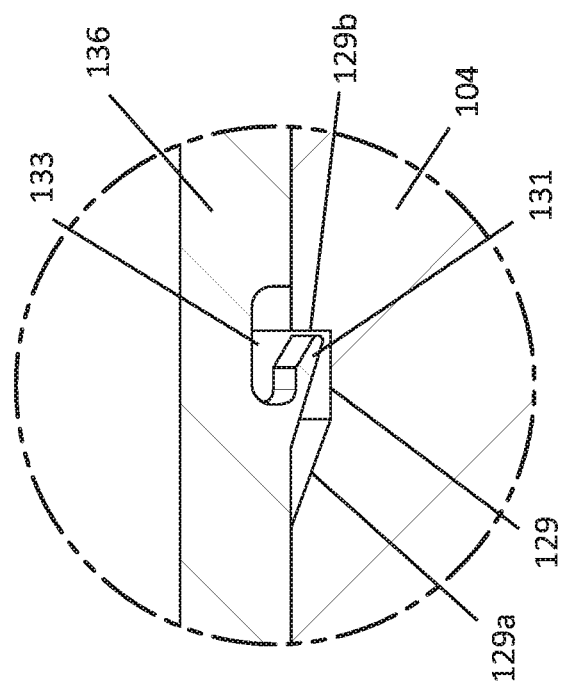
FIG. 8 illustrates an isometric view of FIG. 7.

FIG. 7 shows a detail of FIG. 6. FIG. 8 illustrates an isometric view of FIG. 7. As shown in FIGS. 7 and 8, the ball 104 may have second retention elements 129. The ball 104 may have a single second retention element 129 or a plurality of second retention elements 129, for example two or more second retention elements 129. The retention elements 129 may be a groove that projects or extends away from (e.g., outside) the bore 120 (i.e., away from the regulating element 112). The groove 129 may be spaced apart from the front end 104a of the ball 104. The groove 129 may include a sloped surface 129a that tapers toward the front end 104a of the ball 104a. The groove 129 may also include a vertically extending rear surface 129b (i.e., extending in a direction perpendicular to a length between the front end 104a and the rear end 104b of the ball 104). The groove 129 may extend circumferentially around the bore 120. The housing 136 of the regulating element 112 may have one or more retention members 131 around a circumference of the housing 136 and a cavity 133 adjacent the retention members 131. The cavity may be formed in a wall of the housing 136. The retention members 131 may be a plurality of tabs or flanges configured to be bent or deflected into the cavity 133. The plurality of tabs 131 may be resilient such that the tabs 131 may be deflected into the cavity 133 and return to their original shape or position.

In some embodiments, the plurality of tabs 131 of the regulating element 112 may be configured to be received in the recess 129 of the ball 104 as follows. When the regulating element 112 is introduced into the rear end 104b of the ball 104, the tabs 131 deflect away from the bore 120 or are compressed (e.g., into the cavity 133). When the tabs 131 are adjacent the groove 129 (e.g., by moving the regulating element 112 toward the front end 104a of the ball 104), the tabs 131 spring back to their original shape and are received into the groove 129. The vertically extending rear surface 129b of the groove acts as a stop preventing the tabs 131 and the regulating element 112 from being removed from the rear end 104b of the ball 104. When the tabs 131 are in the groove 129, the sloped surface 129a of the groove 129 permits the regulating element 112 to move toward the front end 104a of the ball 104. As described above, however, the lip 127 may act as a stop preventing the regulating element 112 from being removed from the front end 104a of the ball 104. In some embodiments, the regulating element 112 may be moved toward the front end 104a of the ball 104 when the tabs 131 are in the groove 129. In some embodiments, the regulating element 112 is restricted from moving toward the front end 104a of the ball 104 when the tabs 131 are in the groove 129.

In some embodiments, the valve 100 may be assembled as follows. The regulating element 112 may be assembled inside of the ball 104 as described above. A first valve seat 106 may be placed inside of the valve body 102. The stem 108 may be then inserted into the valve body 102 from the front end 102a. The stem 108 may be pushed and/or pulled through the bore 130 in the valve body 102 until that the flange 132 of the stem 108 is received in the recess 134 of the valve body. The stem 108 may then be rotated until the engagement feature 128 of the stem 108 (e.g., a post or flange) is aligned with the ports 116 (e.g., with the post or flange extending in a longitudinal direction of the valve body 102). The ball 104 containing the regulating element 112 may then be placed inside of the first end 102a of the valve body 102. When inserting the ball 104, the ball 104 may be oriented such that the engagement feature 126 of the ball 104 is aligned with the engagement feature 128 of the stem 108. In some embodiments, the engagement feature 126 of the ball 104 may be slid into engagement with the post 128 of the stem 108. In some embodiments, the ball 104 and regulating element 112 may then be rotated (e.g., by 90 degrees) such that the first and second ends 104a, 104b of the ball 104 are aligned with the ports 116. A second valve seat 106 may be placed inside of the groove 115 of the valve cap 103 and the valve cap 103 may be connected to the first end 102a of the valve body 102 as described above. The packing ring 105 and packing nut 107 may then be connected to the valve body 102, and the handle 110 and fastener 109 may be connected to the stem 108. It should be appreciated that the packing ring 105, packing nut 107, handle 110, and fastener 109 may be attached to the valve 100 before the ball 104 is introduced into the valve body 102.

Figure 9A:
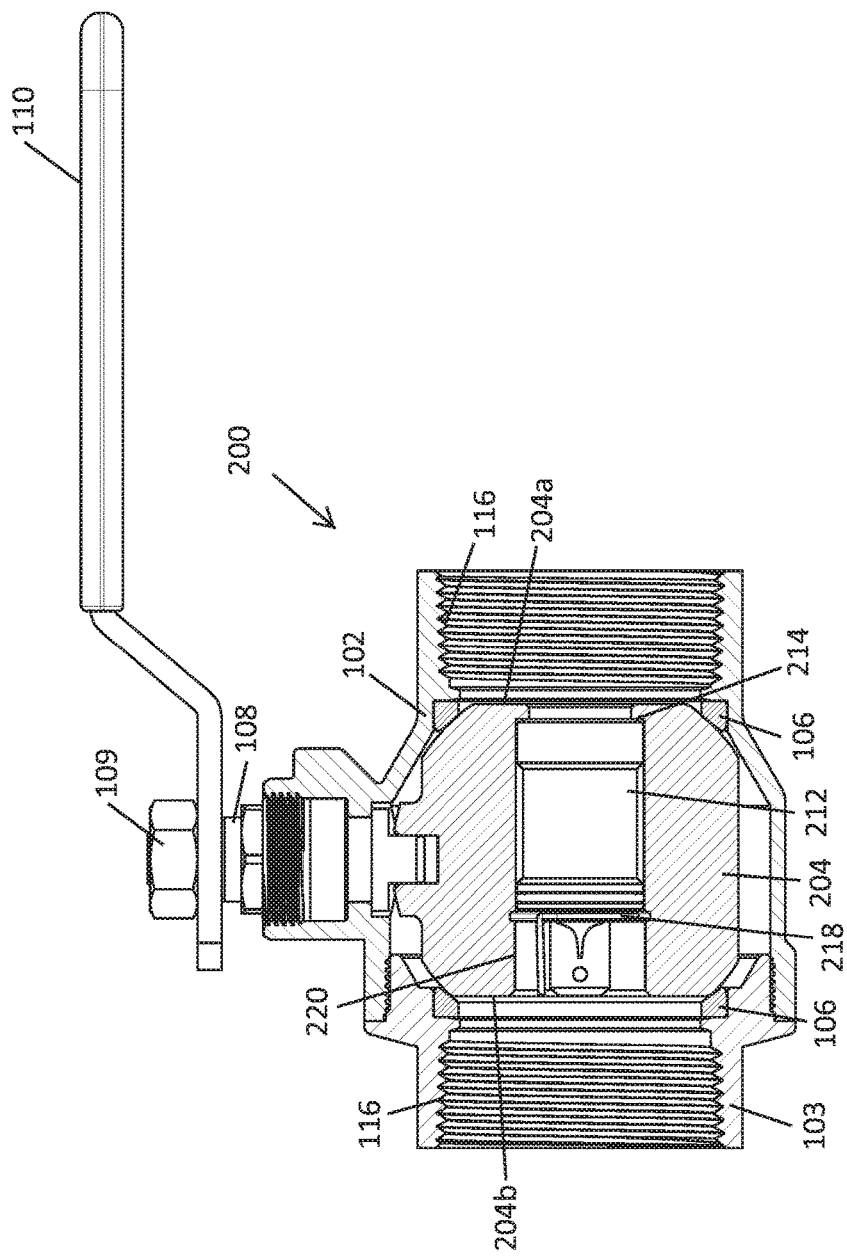
FIG. 9A illustrates a cross-sectional view of an integrated ball and pressure or flow regulating valve according to some embodiments of the invention.
Figure 9B:
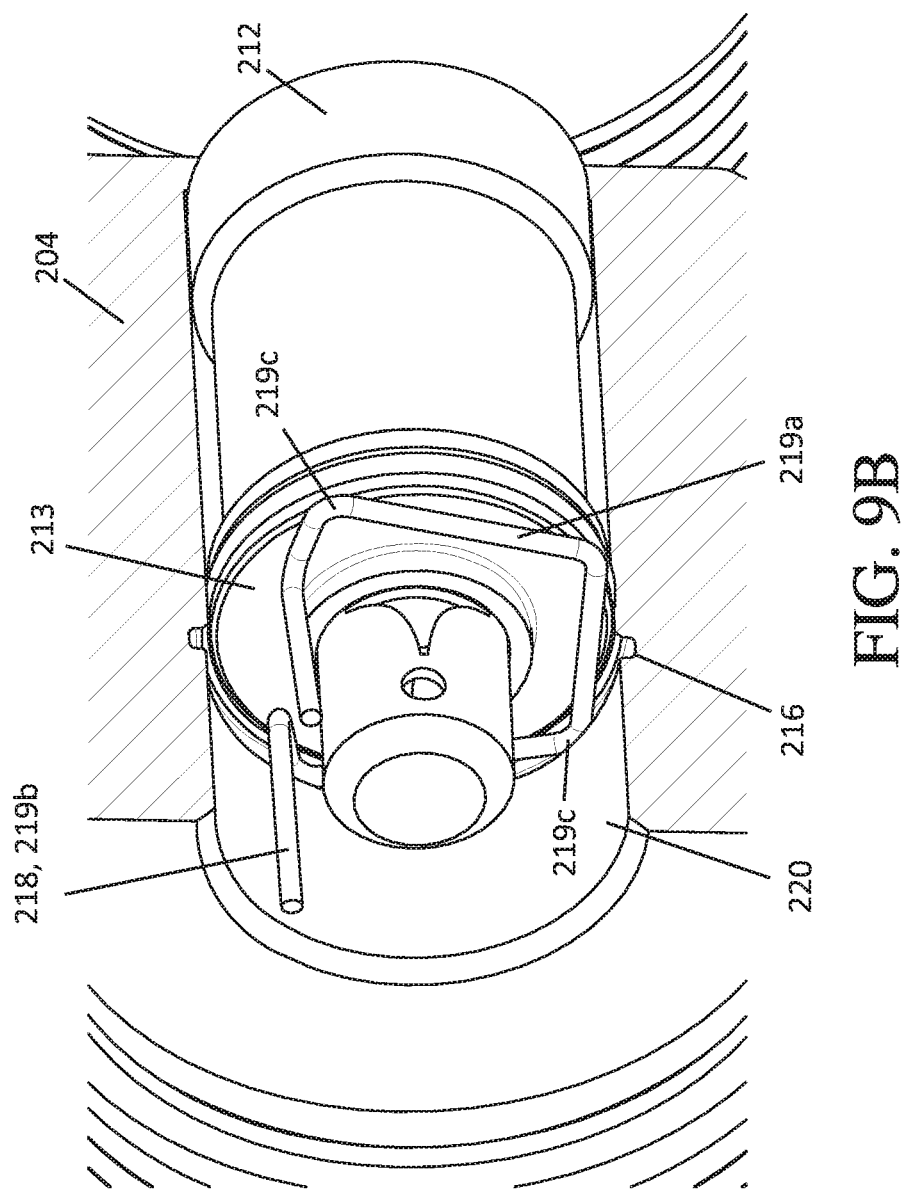
FIG. 9B illustrates a perspective view of a detail of FIG. 9A.

FIGS. 9A-9B illustrate an integrated ball and pressure or flow regulating valve 200 according to some embodiments. The valve 200 of FIGS. 9A-9B includes the valve body 102, valve cap 103, valve seats 106, stem 108, fastener 109, and handle 110 of the previous embodiments. As described further below, a ball member 204 of the valve 200 differs from the previous embodiments.

The valve 200 includes an integrated regulating element 212 that regulates flow through a fluid or gaseous system connected to the valve 200. The regulating element 212 may be a pressure or flow regulating valve that is used to maintain desired output flow rates from the valve 200 or to maintain a constant pressure upstream of the valve 200. In some cases, the regulating element 212 may reduce a high valve inlet pressure to a lower working pressure suitable for desired applications, such as a residential water system. For example, for ball members 204 having ½ inch to ¾ inch opening, the regulating element 212 may permit output flow rates between 0.3 to 2 gallons per minute. For ball members 204 having a 1 inch to 1¼ inch opening, the regulating element 212 may permit output flow rates between 15 to 20 gallons per minute. For ball members having an opening greater than 1¼ inches, the regulating element 212 may permit output flow rates up to 100 gallons per minute. The regulating element 212 may include a control element, such as a biasing spring, that responds to changes in inlet pressure. When the inlet pressure exceeds a threshold force of the control element, the control element moves in response to the pressure and thereby opens or closes the regulating element 212 to permit or restrict flow. For example, a biasing spring may be compressed by incoming fluid flow and may have a spring constant that helps to restrict the output flow to desired rates.

The regulating element 212 is integrated into a passage 220 in the ball member 204 such that the ball member 204 may function similarly to the ball member 104 of the previous embodiments. The regulating element 212 may be integrated into the ball 204 such that a length of the valve body 102 and connected valve cap 103 including the integrated regulating element 212 has the same overall length as a ball valve without the integrated regulating element 212. In addition, the regulating element 212 may be positioned entirely within the ball 204 such that when the ball 204 is rotated, the regulating element 212 rotates with the ball 204. The regulating element 212 may be positioned such that the regulating element 212 is aligned with the ports 116 of the valve 200 when the valve 200 is in the open position, and perpendicular with the ports 116 when the valve 200 is in the closed position.

Figure 10:
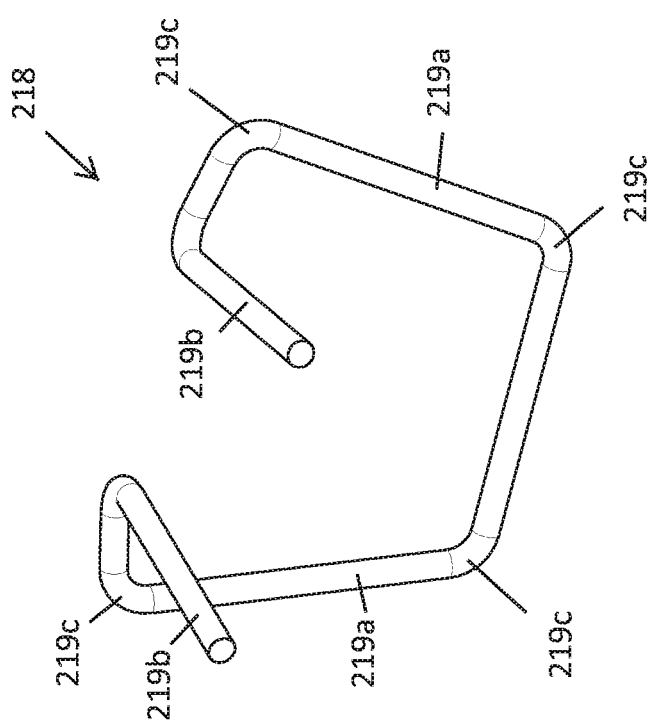
FIG. 10 illustrates a retainer according to some embodiments of the invention.

The regulating element 212 may be integrated into the ball member 204 as follows. The regulating element 212 may be inserted into the ball 204 from a rear end 204b of the ball 204 and moved (e.g., slid) toward a front end 204a of the ball 204. The ball member 204 may have a first retention element 214 in the form of a shoulder that acts as a stop to limit insertion of the regulating element 212 into the ball member 204. The ball member 204 may additionally have a second retention element 216 in the form of at least one groove that acts as a stop to prevent removal of the regulating element 212 back out of the ball 204. As shown in FIGS. 9A to 10, the regulating element 212 may include a retainer 218, which is used to aid in insertion and/or removal of the regulating element 212 as further described below. The retainer 218 additionally cooperates with the groove 216 of the ball member 204 to retain the regulating element 212 in the ball 204.

The retainer 218 may be in the form of a bent resilient wire including groove-fitting portions 219a and tangs 219b. The retainer 218 is flexible such that the tangs 219b may be squeezed towards each other (e.g., rotated or pivoted) such that an outer diameter of the retainer 218 is reduced. The retainer 218 is also resilient, causing the retainer 218 to spring back into a relaxed shape when the tangs 219b are no longer squeezed together. The tangs 219b may be squeezed by an operator's hands such that no additional tools are needed to install or remove the retainer 218 and/or the regulating element 212 from ball member 204.

The groove-fitting portions 219a of the retainer 218 are aligned with and mate to the groove 216. The groove-fitting portions 219a have a diameter that is sized to fit into the groove 216 with little to no play between the retainer 218 and the groove 216. In a relaxed state, the groove-fitting portions 219a may be substantially U-shaped with upper regions that bow outward away from a center of the retainer 218 such that only corners 219c of the groove-fitting portions 219a are situated in the groove 216. The corners 219c of the groove-fitting portions 219 may be rounded or "filleted" to mate closely with the interior of the groove 216. The tangs 219b are substantially aligned with the ports 116 of the valve to aid in insertion/removal of the regulating element 212 (e.g., the tangs 219b may axially extend in a direction facing towards one of the ports 116). The retainer 218 may be made of resilient metal or other material, for example, brass, steel, aluminum, or the like.

In use, the retainer 218 is installed within the passage 220 of the ball member 204 to hold the regulating element 212 in the ball member 204. The regulating element 212 may be first introduced into the passage 220 of the ball member 204 and inserted until the regulating element 212 abuts the shoulder 214 of the ball 204. Subsequently, the retainer 218 is installed in the ball member 204. The tangs 219b of the retainer 218 are squeezed together such that the outer diameter of the retainer 218 is reduced to fit within the passage 220 of the ball member 204. When the retainer 218 is inserted into the ball member 204 such that the groove-fitting portions 219a are aligned with the groove 216 of the ball 204, the tangs 219b are released such that the corners 219c of the retainer 218 engage the groove 216 of the ball member 204. Upon release of the tangs 219b, the regulating element 212 is fully seated in the ball member 204 and is restrained from being inadvertently removed. When installed, the groove-fitting portions 219a of the retainer 218 may abut a face 213 of the regulating element 212, thereby locking the regulating element 212 in the ball member 204. The tangs 219b have a length such that they are fully contained in the ball member 204 and do not interfere with rotation of the ball member 204 between the open and closed positions. It should be appreciated that the regulating element 212 and the retainer 218 may be inserted into the ball member 204 either before or after the ball member 204 is coupled to the valve 200. Further, in some embodiments, the retainer 218 may be coupled (e.g., affixed) to the regulating element 212 prior to insertion into the ball member 204 and both the regulating element 212 and the retainer 218 may be inserted together into the ball member 204. In some embodiments, the groove-fitting portions 219a may be compressed to grip around a portion of the regulating element 212.

Removal of the regulating element 212 from the ball member 204 is performed by first removing the retainer 218. The tangs 219b of the retainer 218 are compressed to reduce the outer diameter of the retainer 218 and withdraw the groove-fitting portions 219a from the groove 216. In the compressed state, the retainer 218 may be removed from the passage 220 of the ball member 204. Subsequently, the regulating element 212 may be removed from the passage 220 of the ball member 204. In some embodiments where the retainer 218 is coupled or affixed to the regulating element 212, the retainer 218 and the retaining element 212 may be removed together.

Figure 11A:
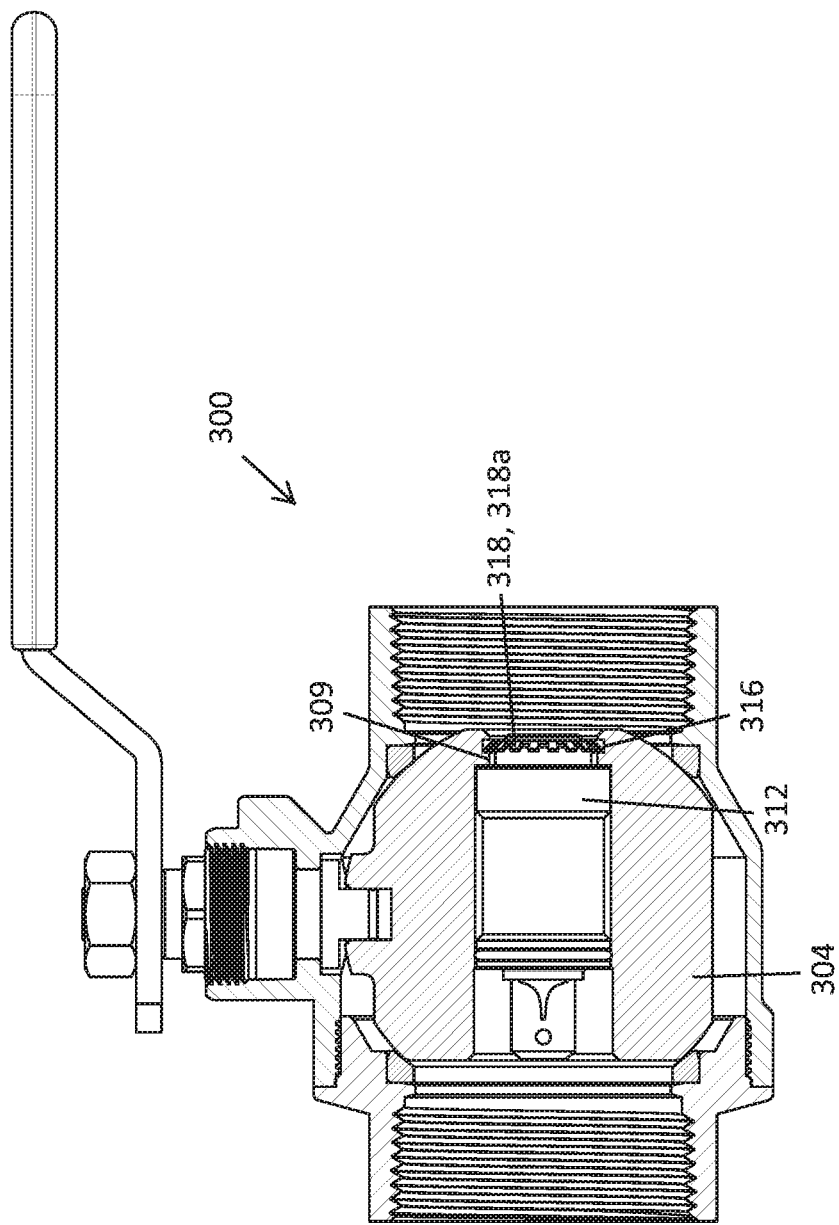
FIG. 11A illustrates a cross-sectional view of an integrated ball and pressure or flow regulating valve according to some alternative embodiments of the invention.
Figure 11B:
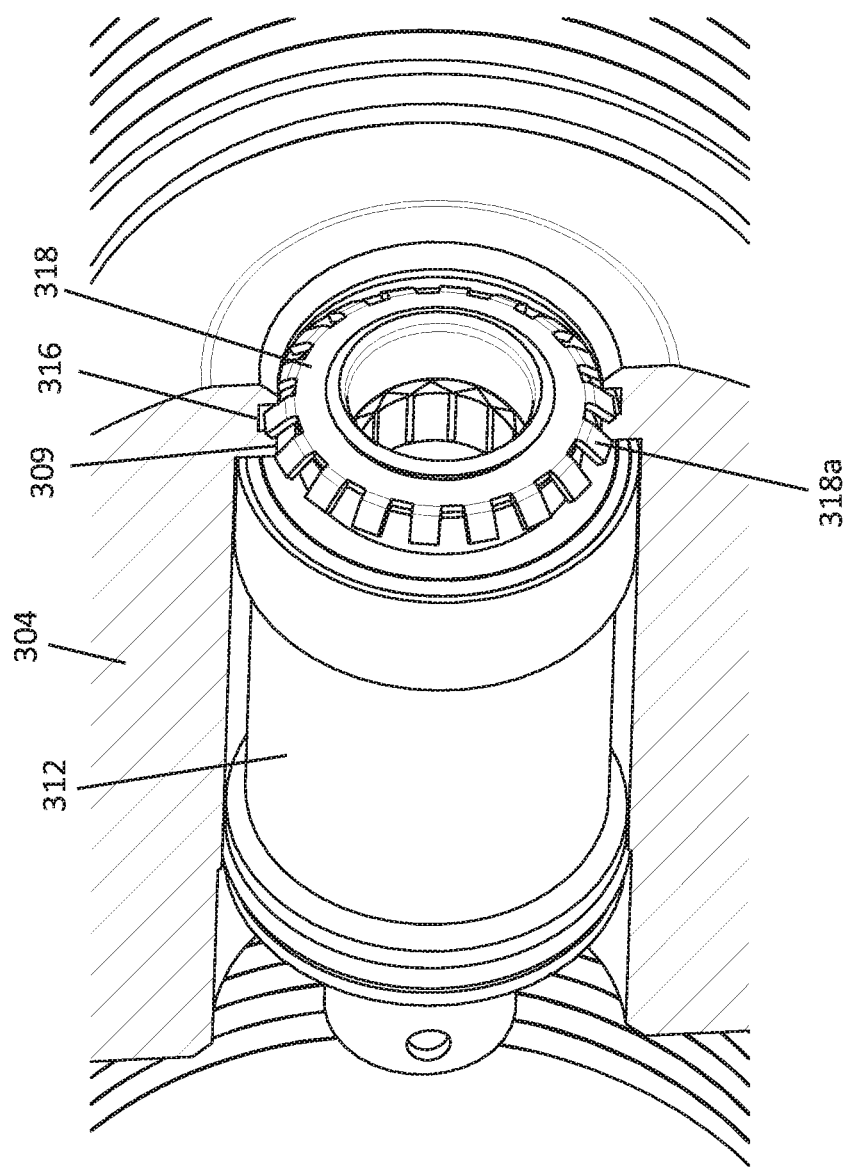
FIG. 11 B illustrates a perspective view of a detail of the cross-sectional view of FIG. 11A.

FIGS. 11A-11B illustrate an integrated ball and pressure or flow regulating valve 300 according to some alternative embodiments. The embodiments in FIGS. 11A-11B differ from the previous embodiment in the manner of connection between a regulating element 312 and a ball member 304. The regulating element 312 of FIGS. 11A-11B includes a retainer 318 with a plurality of flexible tabs 318a that are configured to mate to a groove 316 in the ball member 304. Flexible tabs 318a are affixed to the regulating element 312 and are resilient such that they can be compressed and spring back to a relaxed state when no longer compressed.

In use, the regulating element 312 is inserted into the ball member 304 and the flexible tabs 318a are compressed by an inner passage 309 in the ball member 304. With continued insertion into the ball member 304, the flexible tabs 318a reach the groove 316 and expand toward their relaxed state such that the flexible tabs 318a engage the groove 316. Once the flexible tabs 318a expand into the groove 316, they prevent inadvertent removal of the regulating element 312 from the ball member 304. The flexible tabs 318a of the regulating element 312 may be coupled to the ball member 304 such that the regulating element 312 is removable only by use of a tool (not shown) that compresses the tabs 318a.

While the flexible tabs 318a are depicted in FIGS. 11A-11B as being located in a front region of the regulating element 312, it should be appreciated that, in other embodiments, the flexible tabs 318a may be located at other regions of the regulating element 312.

Figure 12:
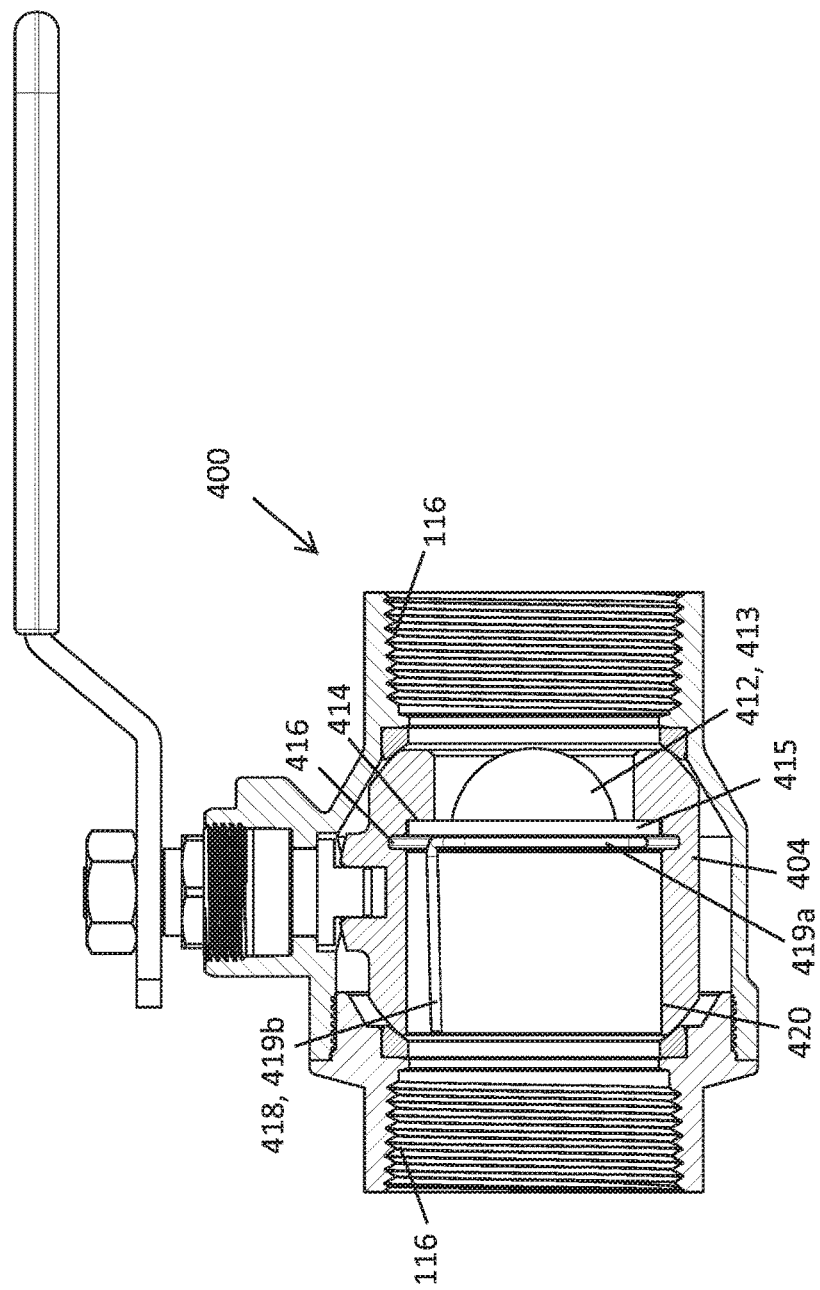
FIG. 12 illustrates a cross-sectional view of an integrated ball valve and filter according to some embodiments of the invention.

FIG. 12 illustrates an integrated ball valve and filter 400 according to some embodiments. The valve 400 includes a regulating element 412 integrated into a ball member 404 of the valve 400. The regulating element 412 includes a filtering element or strainer 413, a flange 415 adjacent the filtering element 413, and a retainer 418. The filtering element 413 may be a mesh having a large number of passages or pores that designed to permit a working fluid or gas to pass through the filtering element 413 while trapping particulates larger than the pore size. In a closed loop system, such as a heating, ventilating, and air conditioning system, the regulating element 412 can be used to trap and remove particulates introduced upon installation of the system. In an open loop system, such as a home water supply system, the regulating element 412 can be used to trap particles from the water source. The filtering element 413 is depicted as a hemispherical member, but may have other shapes.

The valve 400 includes a retainer 418 having groove-fitting portions 419a and tangs 419b, similar to the retainer 218 of FIGS. 9A-10. The retainer 418 is used to insert and remove the regulating element 412 from the ball member 404, as well as retain the regulating element 412 in the ball member 404. In use, the regulating element 412 and the retainer 418 may be installed using a similar procedure as described above with respect to regulating element 212 and retainer 218. The regulating element 412 may be first introduced into a passage 420 of the ball member 204 and inserted until the regulating element 212 abuts a retention element 414 of the ball 404. Subsequently, the retainer 418 is installed in the ball member 404 with groove-fitting portions 419a inserted into a groove 416 of the ball member 404. To install the retainer 418, the tangs 419b are squeezed toward each other such that an outer diameter of the retainer 418 is reduced to fit within the passage 420 of the ball member 204. When the groove-fitting portions 419a are positioned in the groove 416 in the ball member 404, the regulating element 412 is prevented from being inadvertently removed from the ball 404. In such a configuration, the flange 415 of the regulating element 412 abuts the retention element 414 in the form of a shoulder that acts as a stop to limit insertion of the regulating element 412 into the ball member 404. At the same time, the retainer 418 prevents the regulating element 412 from backing out of the ball member 404.

The tangs 419b may be actuated manually by an operator's hand such the retainer 418 and/or the regulating element 412 may be inserted and removed from the valve 400 without additional tools. The tangs 419b have a length such that they are fully contained in the ball member 404 and do not interfere with rotation of the ball member 404 between the open and closed positions. It should be appreciated that the regulating element 412 and the retainer 418 may be inserted into the ball member 404 either before or after the ball member 404 is coupled to the valve 400. Further, in some embodiments, the retainer 418 may be coupled (e.g., affixed) to the regulating element 412 prior to insertion into the ball member 404 and both the regulating element 412 and the retainer 418 may be inserted together into the ball member 404.

In some embodiments, the valve 400 may have a third port for accessing and cleaning particulates out of the regulating element 412. The third port may be off-axis from the ports 116 depicted in FIG. 12 and may be located on the side of the filtering element 413 where particulates are trapped. In some embodiments, the valve 400 may include ports 116 having connectors that permit easy removal of the valve 400 from a pipe system, for example, swagelok connectors. In such a configuration, the valve 400 may be removed from the pipe system for cleaning and maintenance.

Figure 13:
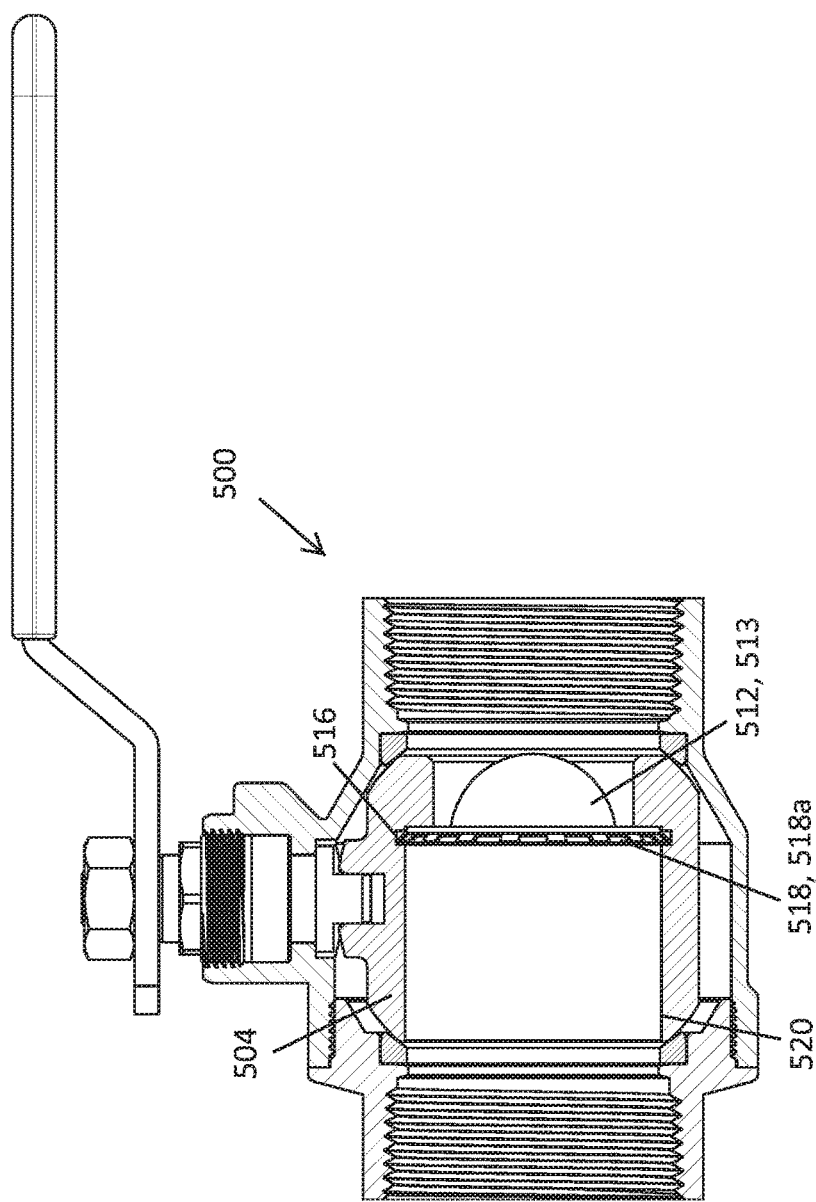
FIG. 13 illustrates a cross-sectional view of an integrated ball valve and filter according to some alternative embodiments of the invention.

FIG. 13 illustrates an integrated ball valve and filter 500 according to some alternative embodiments of the invention. The embodiment of FIG. 13 differs from the previously described embodiment in the manner that a regulating element 512 is secured within a ball member 504. The regulating element 512 includes a filtering element 513, a flange 515 adjacent the filtering element 413, and a retainer 518. The retainer 518 includes flexible tabs 518a similar to the retainer 318 of FIGS. 9A-10. Once the regulating element 512 is inserted into the ball member 504 far enough that the flexible tabs 518a reach a groove 516 in a passage 520 of the ball member 504, the flexible tabs 518a spring outwardly to prevent inadvertent removal of the regulating element 512 from the ball member 504. The flexible tabs 518a thus couple the regulating element 512 to the ball member 504 such that the regulating element 512 is removable only by use of a tool that compresses the tabs 518a.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A ball valve comprising:
a valve body and two ports;
a ball member configured to be inserted in the valve body, the ball member having a passage extending from a first end to a second end of the ball member, and a groove in the passage;
a regulating element separate from the ball member and configured to be inserted in the passage of the ball member; and
a retainer for coupling the regulating element to the ball member, wherein the retainer is expandable to be received in the groove of the passage;
wherein the ball member comprises a stop separate from the retainer that limits insertion of the regulating element into the passage, and
wherein when the retainer is positioned in the groove of the passage, an entire length of the regulating element is located between the first end and the second end of the ball member and the regulating element is restricted from being removed from the ends of the ball member.

2. The ball valve of claim 1, wherein the regulating element is a flow regulating valve.

3. The ball valve of claim 1, wherein the regulating element is a filter for filtering particulates from a fluid or gas flowing through the ball valve.

4. The ball valve of claim 1, wherein the retainer comprises resilient tabs configured to be received in the groove of the passage.

5. The ball valve of claim 1, wherein the retainer comprises resilient tangs, wherein the tangs are compressible towards each other, and wherein when the tangs are compressed towards each other, an outer diameter of the retainer is reduced.

6. The ball valve of claim 5, wherein the tangs are compressible by hand.

7. The ball valve of claim 1, wherein the regulating element and the retainer are monolithic.

8. The ball valve of claim 1, wherein the regulating element and the retainer are separate parts.

9. The ball valve of claim 8, wherein the retainer is insertable into the passage of the ball member from outside the ball member after the regulating element is fully inserted in the passage.

10. An integrated ball and check valve comprising:
a valve body and two ports;
a ball member configured to be inserted in the valve body, the ball member having a bore extending from a first end to a second end of the ball member, a first retention element, and a second retention element spaced apart from the first retention element; and
a check valve having one or more retention members, the check valve configured to be inserted in the bore of the ball member,
wherein the first retention element of the ball member projects into the bore and is configured to retain the check valve inside the first end of the ball member,
wherein the first retention element is a lip of the ball member adjacent the first end of the ball member,
wherein the second retention element of the ball member is configured to engage at least one of the one or more retention members of the check valve to allow insertion of the check valve from the second end of the ball member and retain the check valve inside the second end of the ball member, and
wherein the second retention element of the ball member is a groove in the ball member projecting away from the bore.

11. The integrated ball and check valve of claim 10, wherein when the ball member is located inside of the valve body, the ball member is configured to be rotated to close the integrated ball and check valve and the check valve is configured to be rotated when the ball member is rotated.

12. The integrated ball and check valve of claim 10, wherein the second retention element of the ball member is spaced apart from the first end and the second end of the ball member.

13. The integrated ball and check valve of claim 10, wherein the one or more retention members of the check valve comprises at least one flange configured to be received in the groove of the bore.

14. The integrated ball and check valve of claim 10, wherein the one or more retention members of the check valve comprises a plurality of flanges configured to be received in the groove of the bore.

15. The integrated ball and check valve of claim 10, wherein the groove extends in a circumferential direction around the bore.

16. An integrated check valve and ball valve comprising:
a valve body and two ports;
a ball member configured to be inserted in the valve body, the ball member having a first end and a second end and a bore extending therethrough; and
a check valve having a housing, one or more retention members around a circumference of the housing, and a cavity adjacent the one or more retention members; and
a moveable core member inside the housing, the check valve configured to be inserted into the bore of the ball member from the second end of the ball member,
wherein the check valve is movable from a first configuration in which the check valve is outside the second end of the ball member, to a second configuration in which the check valve is located between the first end and the second end of the ball member, and
wherein the one or more retention members comprise one or more resilient tabs configured to be deflected into the cavity by the ball member when the check valve is moved from the first configuration to the second configuration.

17. The integrated check valve and ball valve of claim 16, which further includes a groove that projects into the ball member and is engageable by the one or more resilient tabs to restrain the check valve against movement from the second configuration to the first configuration.

* * * * *